Sept. 28, 1948.  P. E. NOKES  2,450,054
AREA MEASURING MACHINE USING LIGHT BEAMS
Original Filed Aug. 25, 1941  3 Sheets-Sheet 1

Inventor
Philip E. Nokes
By his Attorney

Sept. 28, 1948.    P. E. NOKES    2,450,054
AREA MEASURING MACHINE USING LIGHT BEAMS
Original Filed Aug. 25, 1941    3 Sheets-Sheet 2

Inventor
Philip E Nokes
By his Attorney

Sept. 28, 1948.　　　　　P. E. NOKES　　　　　2,450,054
AREA MEASURING MACHINE USING LIGHT BEAMS Original Filed Aug. 25, 1941　　　　　　　　　3 Sheets-Sheet 3

Inventor
Philip E. Nokes
By his Attorney

Patented Sept. 28, 1948

2,450,054

UNITED STATES PATENT OFFICE 2,450,054

AREA MEASURING MACHINE USING LIGHT BEAMS

Philip E. Nokes, Beverly, Mass., assignor to United Shoe Machinery Corporation, Flemington, N. J., a corporation of New Jersey Original application August 25, 1941, Serial No. 408,228. Divided and this application May 11, 1944, Serial No. 535,115

2 Claims. (Cl. 88—14)

This invention relates to area measuring of sheet material and is a division of application Serial No. 408,228, filed August 25, 1941, in my name, now Patent No. 2,354,767. While the invention is illustrated with reference to measurement of the superficial areas of hides and skins, it is to be understood that the invention and various important features thereof may have other applications and uses.

In methods and devices heretofore employed in area measuring operations upon sheet material of irregular contour, involving scanning operations performed with the aid of a photocell, it has been necessary to integrate the time intervals during which the scanning beam is on the surface to be measured, or off it, as the case may be. It is well known that time intervals are difficult to integrate accurately. Furthermore, they may be interfered with, either inadvertently or intentionally, with disastrous results with respect to correct measurement of the work piece. If, for instance, the work piece be retarded in its movement past the scanning beam, due to error in the work feeding operation, the exposure to the scanning operation will be lengthened and an incorrect indication of measurement be obtained. It is a distinct advantage of my invention that there is no integration of irregular and interrupted time intervals. On the contrary, my invention depends simply upon the counting of reflected light beams having a regularly spaced relation to each other, by which the area of a work piece may be readily calculated. Furthermore, the photocell and its associated electrical circuits will respond to the intermittent impulses furnished by the spaced light beams since they are either present or absent, in the latter case being obscured by the work piece on the work backing member. There is no possibility of falsifying the record by displacing the work piece unless it result from deliberate intention.

From one viewpoint, the invention resides in means operative to scan in successive straight lines the exposed portions of a relatively extensive and mirror-like work backing or supporting surface for reflected light beams projecting from portions of said surface, in combination with means for selecting, counting and totalizing such light beams.

In one embodiment of the invention a polished reflecting surface may be provided on the work support. The reflecting surface is of such size that when a piece of sheet material to be measured is placed on the surface the sheet material will cover only a portion of the surface. Light reflected or emanating from the uncovered portions of the surface functions as a means whereby the area of the leather, i. e., the area of the covered portion of the surface, is measured. A mirror turning about a horizontal axis above the work supporting surface performs a scanning or light receiving operation for successive regularly spaced, and straight rows of reflected light beams and concomitantly therewith transmits the results of the scanning operation to a second mirror turning at a speed about a vertical axis to scan the first-mentioned mirror for light beams in each row and to transmit such beams to the perforations in the periphery of a rapidly revolving disk, which disk serves as a shutter to select discrete and regularly spaced, individual light beams, which individual light beams are passed or projected to a photo-electric cell serving as an essential element of an indicating means. By such means, the selected light beams proceed from regularly spaced spots or portions of the work supporting surface and the number of beams not intercepted by a work piece on the surface serves to indicate the area of such work piece.

It will be understood that a plurality of sets of mirrors will be required for large skins and sides of leather. The disclosed arrangement of mirrors for scanning a work support or work backing member and selecting one or more light beams in each of a plurality of parallel lines of sources of such light beams in an apparatus for measuring stationary pieces of work has the advantage of keeping the movable parts to a minimum, thereby simplifying the structure and reducing the cost of maintenance.

These and other important characteristics and features of the invention, together with novel combinations of parts, will now be described in detail in the specification and then pointed out more particularly in the appended claims.

Figure 1:
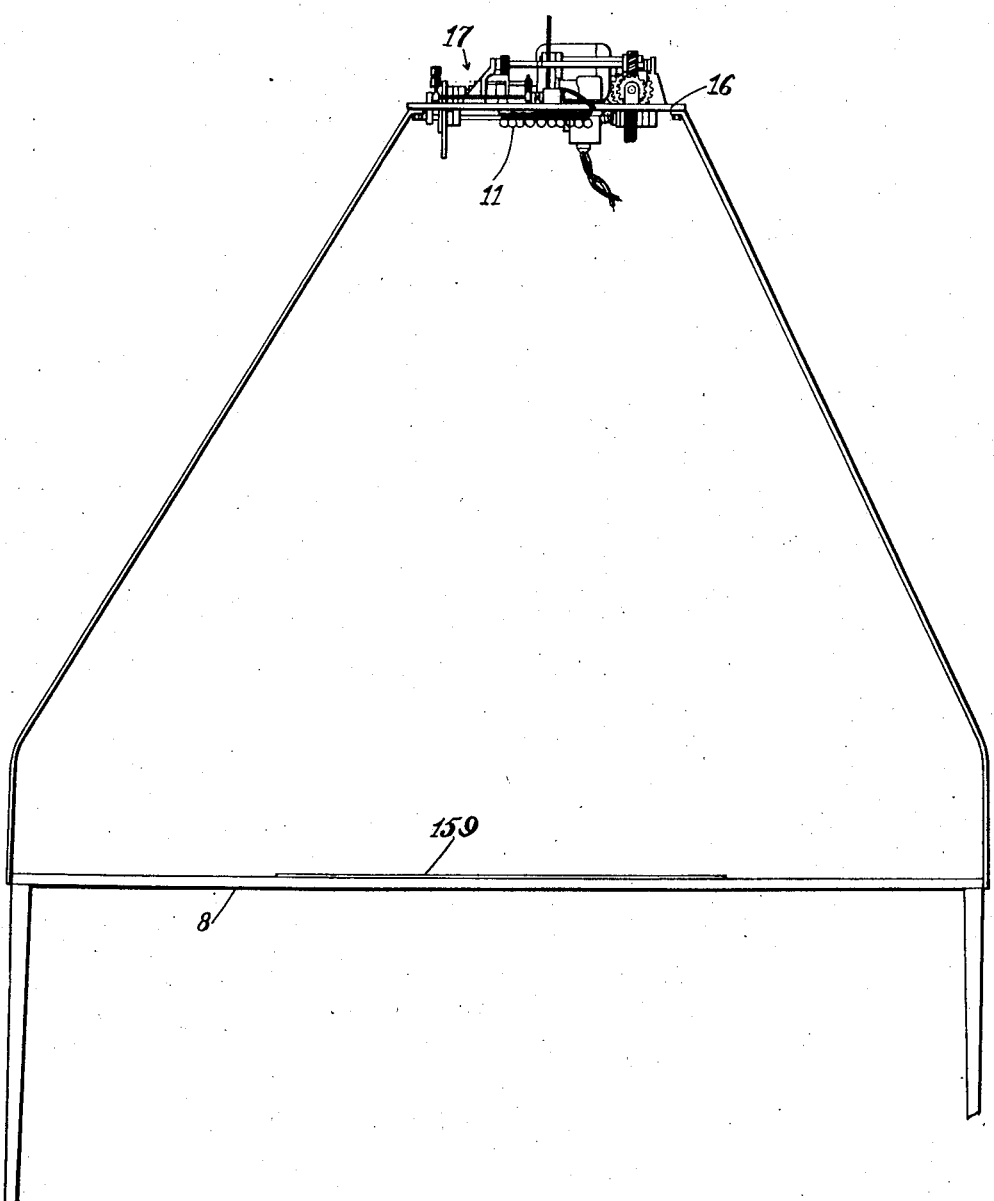
Fig. 1 is a front elevation of an area measuring machine illustrating one embodiment of the invention.

In the illustrated machine which is specially designed for the measuring of the superficial areas of articles of irregular contour, such as hides and skins, there is provided a work supporting table 8 (Figs. 1 and 2), said table having an upper polished reflecting surface. Above the table 8 there is placed a plurality of sources 11 (Figs. 1, 2, 3 and 4) of light so placed in position as to give substantially uniform illumination of the polished upper surface of the table.

Mounted on a platform 16 at a suitable distance above the table 8 is a scanning mechanism 17 comprising a mirror or other reflector 18 (Fig. 2) carried by a shaft 20 the axis of which is parallel to the surface of the table 8. Preferably the mirror is so mounted that the axis of the shaft is in the reflecting surface of the mirror. As shown, the shaft 20 extends centrally across an opening in the platform 16 so that, as the mirror is rotated, it receives simultaneous beams of light reflected from each of successive straight and parallel strips of the table 8 reflecting surface not covered by the work piece on the table, each strip being narrow and of a length more than sufficient to traverse the work piece. Mounted on the platform 16 opposite to the transverse median line of the primary mirror 18 is a second mirror 22 rotatable about the vertical axis of a shaft 24, said axis being preferably in the plane of the reflecting surface of the mirror 22. It will be readily understood that light will momentarily be directed toward the full length of a substantially straight strip of the upper surface of table 8 and that an amount of that light (dependent upon the area of sheet material to be measured that is coextensive with the strip) will be scanned by the mirror 22 one time for each of said strips. Light beams reflected from mirror 22 as a result of the scanning pass through an opening or aperture 26 in a tube 27 to a photoelectric cell 28 in a housing 29, the photocell being in an electrical circuit which will hereinafter be described in detail. From one viewpoint, the primary mirror 18 may be said to scan the work support 8 for line after line of beams (regularly spaced), while the second mirror scans the primary mirror for localized beams from each line of beams, these localized beams being directed to the photocell through the aperture or tube opening 26.

Figure 4:
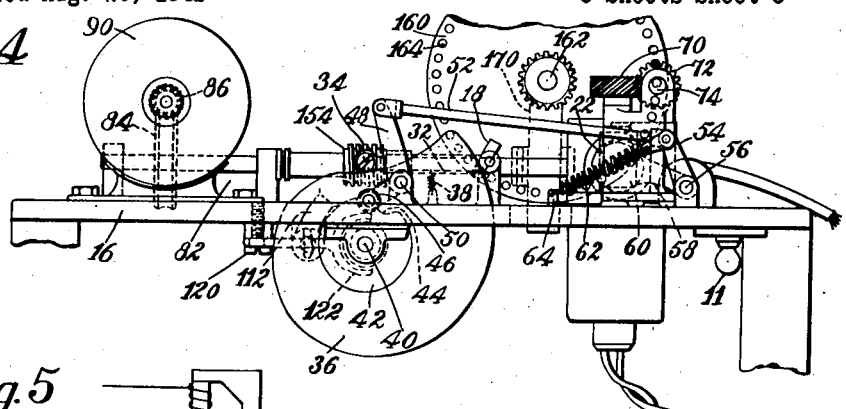
Fig. 4 is another side elevational view looking at the mechanism of Fig. 2 in the direction of the arrow IV.

As heretofore stated, the mirror 18 is mounted on a shaft 20 supported in bearings 30 carried by the platform 16. At one end the shaft 20 has secured thereto a link 32 (Figs. 2, 3 and 4), the other end of which carries a pin upon which is mounted a roller 34 arranged to follow the cam surface of the relatively large cam member 36, the said roller 34 being yieldingly held in contact with the cam by a spring 38 (Fig. 4). As the cam 36 rotates about the axis of its driving shaft 40 (Fig. 2) the mirror 18 is rocked first in one direction and then in the reverse direction, the rate of rotating movement being about five per minute whereas the mirror 22 is rotated at about 2000 R. P. M. It will be understood, of course, that the rate of rotary movement of the mirrors 18 and 22 should suit a number of factors, such as the size of the work support or backing member. For instance, a convenient size for the work support 8 in an apparatus specially designed for measuring sheep, kid and calf skins is 5 x 6 feet. If, now, the surface of such work support member be considered as divided into sections measuring $\frac{1}{10}$ of a foot in each direction, and if the axis of the mirror 18 be placed at 6.7 feet above the work support, the said mirror may be arranged to turn about its horizontal axis at the rate of approximately 5 R. P. M., in which case the mirror 22 may be rotated about its axis at the rate of about 2000 R. P. M.

Figure 2:
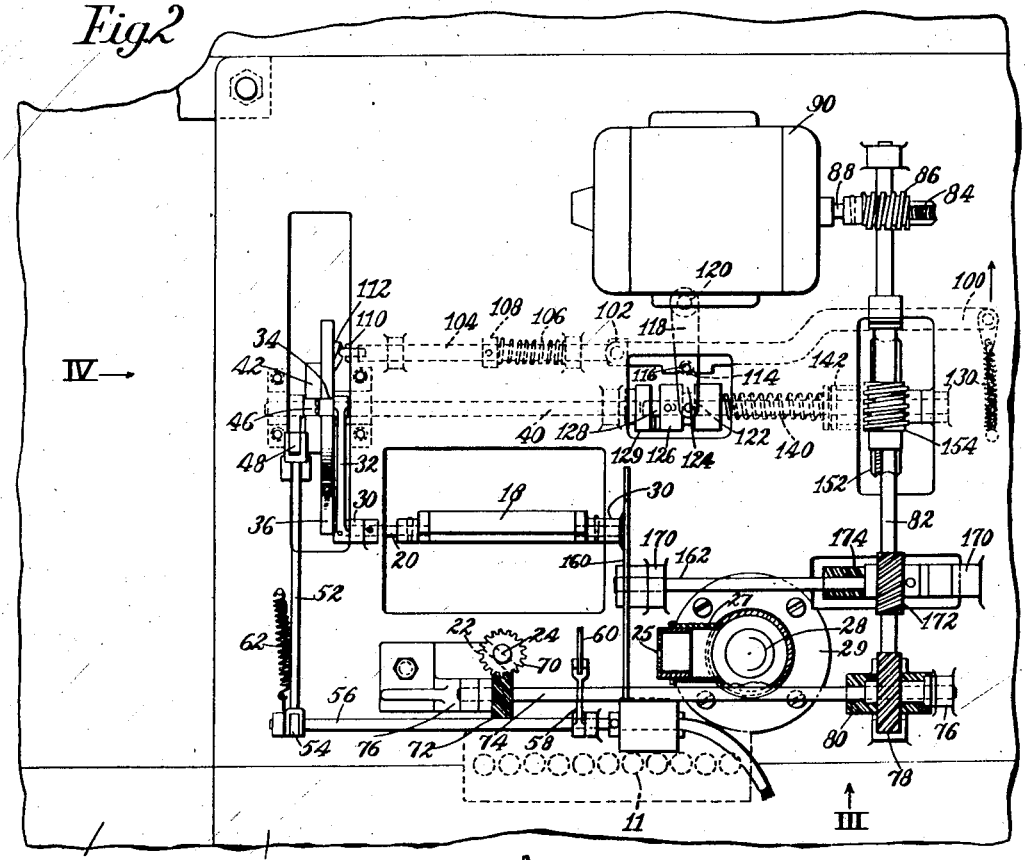
Fig. 2 is a plan view from above of the machine shown in Fig. 1 and particularly of the scanning mechanism.
Figure 3:
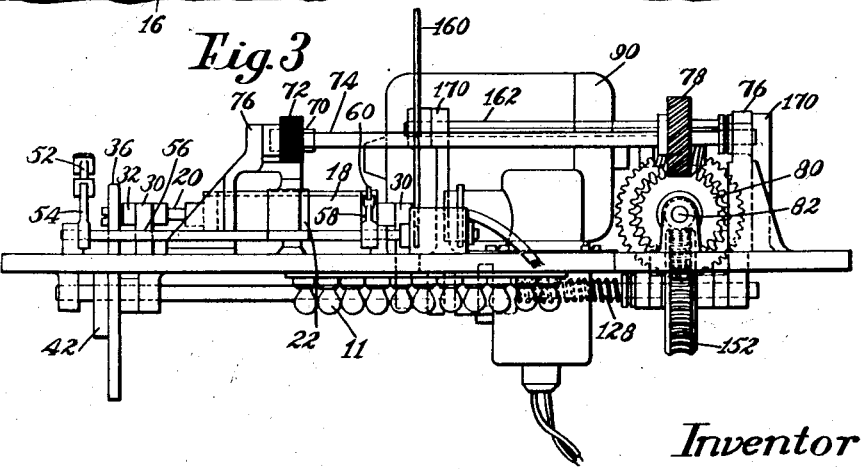
Fig. 3 is a view in elevation of the parts shown in Fig. 2 looking in the direction of the arrow III.

Also secured to the shaft 40 is a cam member 42 (Fig. 4) having a low part 44 for the reception of a roller 46 carried at the lower end of a bell crank lever 48, pivoted at 50 to a bracket extending upwardly from the platform 16. At its upper end the lever 48 has pivoted thereto a link 52 the other end of which is also pivotally attached to a ever arm 54, the lower end of which is secured to a shaft 56 to which is secured an arm 58 carrying at its free end a shutter 60 adapted to be positioned between the mirror 22 and the aperture 26 when no work piece is in position on the table 8. For holding the shutter 63 yieldingly in its operative position (shown in Fig 4) there is provided a spring 62 connected to the upper end of the lever arm 54 and to a member 64 rigidly attached to the platform 16. As heretofore stated, the mirror 22 is mounted on a vertical shaft 24 (Fig. 2). At its upper end the shaft 24 has fixedly secured thereto an oblique gear 70 which is arranged to be constantly in mesh with another oblique gear 72 secured to a shaft 74 mounted at its ends in bearings 76 carried by the platform 16. Adjacent its other end the shaft 74 has secured thereto an oblique gear 78 arranged to be constantly in mesh with an oblique gear 80 secured to one end of a shaft 82 having adjacent its other end a worm gear 84 (Fig. 2) in mesh with a worm 86 on armature shaft 88 of an electric motor 90. The arrangement of the gears is such that the shaft 24 of the mirror 22 is rotated at high speed, preferably at about 2000 R. P. M.

In order that the operator may initiate operation of the scanning mechanism, after a work piece has been placed upon the table 8, there is provided a lever 100 (Fig. 2) pivoted at 102 to one end of a shaft 104 slidable endwise in bearings on the under surface of the platform 16, a spring 106 being provided between one of the bearings and a collar 108 fixed to the shaft 104 to urge said shaft 104 constantly toward the left in Fig. 2 to press a roller 110 on the end of the shaft against the face of the cam member 36, the said roller 110 being in the path of a surface cam 112 (Figs. 2, 4) conveniently carried by cam member 36. It will be observed that the lever 100 has a slot at 114 for the reception of a pin 116 extending upwardly from a lever 118 pivotally mounted at 120 on the under side of the platform 16. The other end of said lever 118 is forked at 122 and is provided with rolls receivable in a circular recess 124 in a clutch member 126 pinned to a shaft 128 for sliding movement lengthwise thereof. As shown, shaft 128 is mounted in alinement with the shaft 40 in bearings carried by the platform 16 on the lower surface thereof. When moved to the left in Fig. 2 the clutch member 126 engages a second clutch member 129 fixedly secured to the adjacent end of the shaft 40 which carries cam members 36 and 42, as above described. As clearly shown in Fig. 2, the lever 100 is held by a spring 130 with the recess 114 in said lever 100 engaging the pin 116 on the lever 118. When the lever 100 is manually moved in the direction of the arrow in Fig. 2 the pin 116 is disengaged from the slot 114, thus freeing the lever 118 and the clutch member 126 for movement by spring 140 which is compressed between a stationary collar 142 and the movable clutch member 126. In this way provision is made for clutching the shaft 40 to a source of power represented by the driven shaft 128 (Figs. 2 and 3), which has secured thereto a worm gear 152 arranged to be constantly in mesh with a worm 154 (Fig. 2) on the shaft 82 constantly driven from the electric motor 80, as above described. When the operator moves the hand lever 100 (Fig. 2) in the direction of the arrow (Fig. 2) the shaft 40 is clutched to the driven shaft 128 in the manner above described, with the result that the mirror 18 is oscillated to effect a scanning operation of the work support for light beams from uncovered portions of the reflecting surface of table 8 surrounding a work piece thereon to be measured. During the time that the mirror 18 is moving in said scanning operation, the shutter 60 is held by the cam 42 in its inoperative position, i. e., in such position as to permit light beams to enter the photocell 28 from mirror 22. At the end of the rotation of the cam 36 and of the mirror 18 (upon completion of the scanning operation) the shutter 60 is moved to its operative position between the mirror 22 and the photoelectric cell 28 to shut off the light beams and at the same instant the face cam 112 arrives in position to shove the shaft 104 toward the right in Fig. 2, thereby causing disengagement of the clutch member 126 with respect to the clutch member 129 so that the shaft 40 comes to rest, the clutch member 126 being held in its nonclutching position by engagement of the pin 116 on the lever 118 in the recess 114 of the manually operable lever 100. Hence, at the end of the scanning operation on a given piece of work the mirror 18 comes to rest with the shutter 60 in its operative position, cutting off light from the photocell 28. Obviously the purpose is to prevent access of adventitious light impulses to the photocell after measurement of the work piece has been accomplished.

During scanning of the work table 8 by the mirror 18 it will reflect beams parallel to each other and, in the illustrated construction, parallel also to the surface of the work support 8. Since the mirror 22 is turning at high speed it scans the beams being reflected from the mirror surface 18 along a line extending lengthwise of the latter's axis, it being clear that a beam reflected from one end of the mirror 18 will strike the mirror 22 at one angle and that a beam being reflected from a point nearer to the transverse central line of said mirror 18 will strike mirror 22 at a different angle. The mirror 22 scans the whole length of any given line of beams showing in proper position on the mirror 18 in one rotation of said mirror 22 as the latter views said line of beams from one end to the other while said mirror 18 continues its scanning movement. Since the mirror 18 scans the whole surface of the table in about ¾ of a second the vertical mirror must turn at high speed to scan each line of beams appearing on the primary mirror 18. During the scanning movement of the mirror 18 it will happen that beams will be reflected uniformly from the reflecting surface of the table 8 instead of from a single strip. However, in the construction shown, only those beams reach the mirror 22 which are reflected from the mirror 18 along a horizontal path from the latter. This insures that beams from the reflecting surface of table 8 will be reflected by the mirror 18 to mirror 22 in strip after strip and not simultaneously from two or more strips extending substantially parallel to the axis of the mirror. Since the light beams are continuously reflected from mirror 22 toward the aperture 25 and the photocell 28, except when intercepted by the work piece at the first points of light reflection, it is necessary to select certain light beams projected from such first points (where the polished surface of the table 8 is not covered by a work piece 159), the said selected beams comprising beams from certain lines or series of light beams which are evenly or regularly spaced. In the illustrated construction, the selecting means is in the form of a perforated shutter or light-chopper 160 positioned to be driven by a horizontal shaft 162, the shutter being located between the vertical mirror 22 and the photocell 28. In an apparatus of the dimensions specified above, this shutter 160 will have about 200 perforations 164 (Fig. 4) located in a circle concentric with the shaft 162 and will rotate at about 9000 R. P. M. As already stated, there is provided, between the shutter 160 and the photocell 28, a diaphragm with an aperture 25 therein, as in Fig. 2, so located and the aperture being of such size as to direct beams of light passed by the light-chopper 160 to said photocell. The reflection from a highly polished mirror-like surface is so much more intense than that from any leather surface, even from a smooth white leather surface, that there is no difficulty in providing photocells and circuits which will respond only to the impulses from the polished metal surface. Shaft 162 is suitably mounted in brackets 170 on the platform 16 and driven by oblique gears 172 and 174 from the shaft 82. With such an arrangement, the beams reflected or not reflected from regularly spaced spots on the polished surface of the table 8 may be counted and the summation of the number of such beams may serve as an indication of the area of the work piece 159.

It will be understood that several scanning devices, including mirror 18 and mirror 22, will be provided in sets and properly combined to take care of large size skins. For instance, in the case of very large areas, such as sides for upper leather, a scanning set will be provided above the center portion of each quarter of the work supporting table 8, the arrangement being such that each photocell in turn sends its impulses into the counting mechanism hereinafter described.

By reason of the speed of the operation of the scanning device the impulses are received from the photocell very rapidly and they are not sufficiently powerful to operate a mechanical counter. Accordingly, these impulses are delivered through an electronic counting circuit to the operating electromagnet of the mechanical counter. A special electronic counting circuit for this purpose is described in my copending application Serial No. 408,229, filed August 25, 1941, for Improvements in electrical counters, now Patent No. 2,354,768, and involves the use of amplifying circuits and accumulating condensers to which unit charges are delivered by a trigger or charging circuit as each impulse is received from the photocell. At the completion of the counting operation these accumulated charges are delivered by the condensers through discharge circuits to the operating electromagnets 1260 of a registering device such as that illustrated in Fig. 5.

In the type of area measuring machine herein disclosed the light impulses received by the photocell 28 depend upon the absence, at a particular point, of an article to be measured. Hence it is necessary to subtract the count which has been made from a constant corresponding to the area of the work supporting surface of the machine, only a portion of which is covered by the article to be measured. In the illustrated machine, an impulse may be received by the photocell from each of 3000 squares each one-tenth of a foot square. Hence, the constant from which subtraction must be made is 3000.

Figure 5:
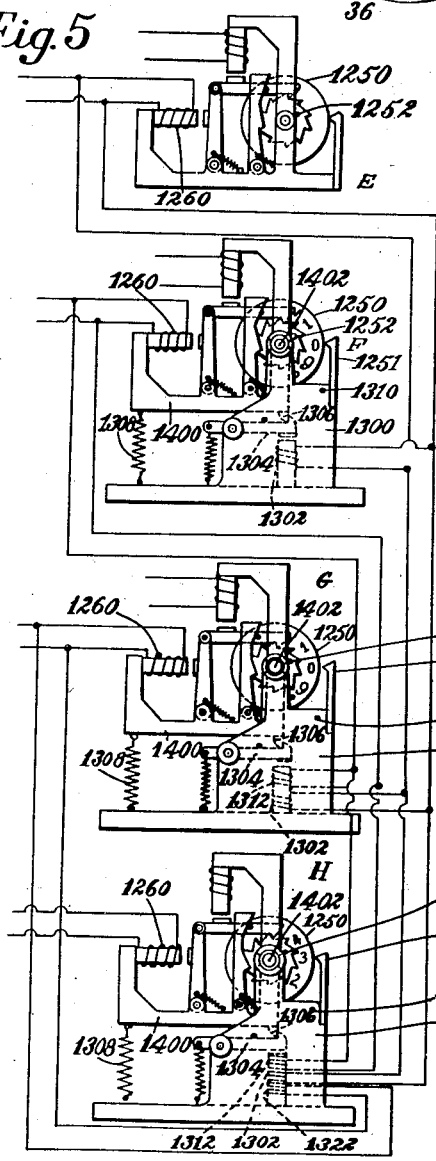
Fig. 5 is a detail of a counter mechanism specially applicable to this machine.

In Fig. 5 the figure wheels 1250 are numbered backwards and are provided with a special correcting device to be described. Inasmuch as the constant is more than one thousand, it will be necessary to provide a counting circuit with an accumulating condenser having a capacity such that it will not be discharged automatically until 10,000 unit charges have been received. This circuit will be connected directly to the operating electromagnet 1260 of a counter H in association with counters E, F, and G. In each of the counters F, G and H the frames 1400 are pivotally mounted at 1402 upon a base 1300 in which there is provided a correcting coil 1302 of an electromagnet and the action of this coil is similar to the mechanical carry-over utilized in mechanically interconnected counters. When the coil 1302 is energized it draws down a latch 1304 engaging a projection 1306 and allows the whole frame 1400 to be drawn down by a spring 1308, thereby tilting the frame 1400 until the projection 1306 strikes a stop pin 1310. This angular tilting movement of the frame 1400 is sufficient to carry the next number on the figure wheel 1250 (rotatable about the axis of pivot 1402) to a position opposite the reference pointer 1251, thus in effect subtracting 1 from the digit to be read on the figure wheel and corresponding in effect to a movement of the reference pointer 1251 a distance equal to the space between successive digits. It will be observed that a return spring 1252 is provided on each of the counters E, F and G and that they are arranged to return these figure wheels to zero after the count has been taken. On the other hand, the corresponding spring 1252 on the counter H is arranged to return its figure wheel to the number 3, for the reason that the impulses received are to be subtracted from the constant 3000. In the counter G there has been provided both the correcting coil 1302, and a coacting and additional coil 1312. In the counter H, three correcting coils 1302, 1312 and 1322 are positioned on the same core and an impulse received by any one of the three is sufficient to release the latch 1304 and to permit the tilting of the corresponding frame 1400 to bring the figure 2 opposite the pointer 1251.

The principle of the corrective action of these coils depends upon the fact that the number which is to be subtracted from the constant 3000 may vary from 1 to 2999 and the arrangement is such that, when any of the digits in that counted figure which is to be subtracted is a finite number other than zero, then all the digits to be read at the left of it must be corrected by subtracting 1. As shown, the counters E, F, G and H are arranged one above the other so that the operating magnets 1260 may obviously be connected to similar individual discharge circuits (not shown). The final result to be read from the figure wheels will be read from the figure wheels in the counters H, G, F, E from bottom to top.

In accordance with this principle, the coils 1302 in the counters F, G and H are connected to the circuit which energizes the electromagnet 1260 of the counter E so that a correction of one will be made whenever the number recorded by counter E is one or more than one. Similarly, the coils 1312 (of counters G and H) are connected to the circuit which energizes the magnet 1260 of the counter F, and the remaining coil 1322 in the counter H is connected to the energizing circuit of a magnet 1260 in the counter G. When no impulses are received in any of the counters E, F and G, the corresponding correcting coils 1302, 1312 and 1322 will not be energized. On the other hand, the action of these coils is additive so that the energization of any one of them is sufficient to release the latch 1304 of the counters below it which will correspond to the figures to the left of this digit in the final result.

It will be understood that the counting or accumulating and carrying over usually performed mechanically are here done electrically, requiring only the final setting of a group of independent figure wheels 1250 to be done mechanically.

Having described my invention, what I claim as new and desire to secure by Letters Patent of the United States is:

1. An apparatus for measuring the area of sheet material including a work supporting member having a reflecting surface for light received from a source spaced therefrom, a mirror system for scanning the said reflecting surface to transfer light reflected from said surface in the form of a beam, a photocell positioned in the path of the said beam, a shutter mounted to operate in synchronism with the mirror scanning system and regularly to interrupt passage of the beam to the photocell, and means associated with said photocell for counting the impulses produced therein as an indication of the area of sheet material placed upon said supporting member.

2. An apparatus for measuring the area of sheet material including a work supporting member having a reflecting surface for light received from a source spaced therefrom, a mirror mounted for scanning the work supporting member to transfer light reflected from said surface in the form of a beam, a second mirror rotated on an axis at an angle to the first mirror to reflect light received from the first mirror, a photocell positioned in the path of the light reflected from the second mirror, a shutter mounted to operate in synchronism with the two mirrors regularly to interrupt passage of light to the photocell, and means associated with said photocell for counting the impulses produced therein as an indication of the area of sheet material placed upon said supporting member.

PHILIP E. NOKES.

REFERENCES CITED

The following references are of record in the file of this patent:

UNITED STATES PATENTS

| Number | Name | Date |
| --- | --- | --- |
| 2,184,156 | Bowles | Dec. 19, 1939 |
| 2,184,159 | Stockbarger et al. | Dec. 19, 1939 |
| 2,184,162 | Stockbarger et al. | Dec. 19, 1939 |